No. 656,588. Patented Aug. 21, 1900.
W. M. STARR.
BICYCLE SADDLE.
(Application filed Sept. 29, 1898.)
(No Model.) 2 Sheets—Sheet 1.
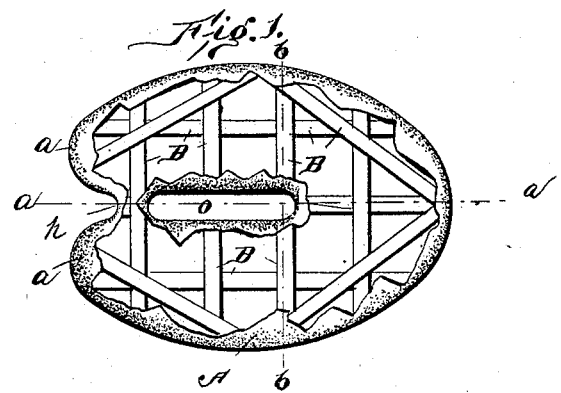
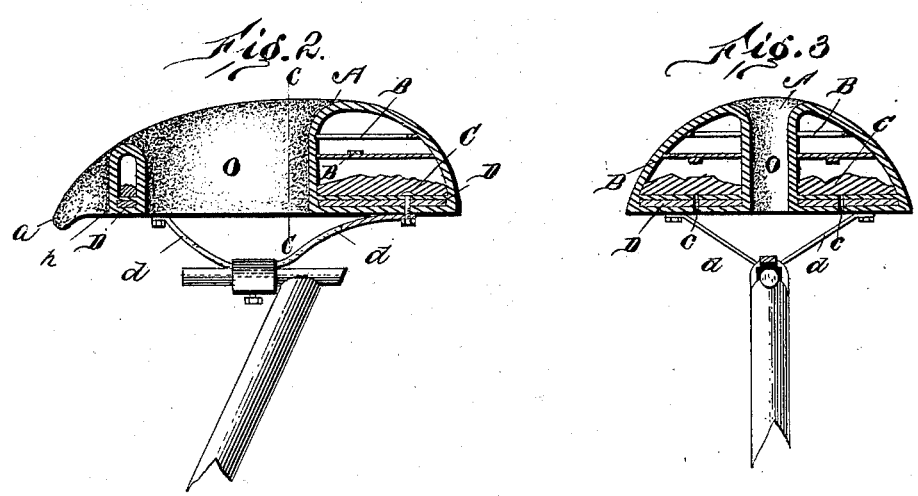
WITNESSES:
F. C. Barry
INVENTOR
Wm. M. Starr
BY
O. E. Duffy
ATTORNEY No. 656,588. Patented Aug. 21, 1900.
W. M. STARR.
BICYCLE SADDLE.
(Application filed Sept. 29, 1898.)
(No Model.) 2 Sheets—Sheet 2.
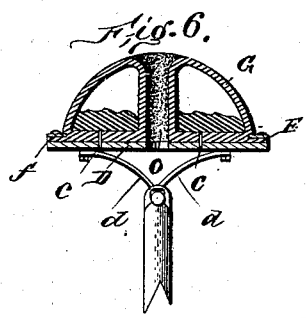
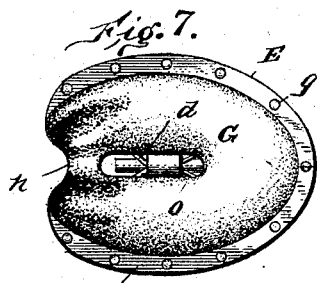
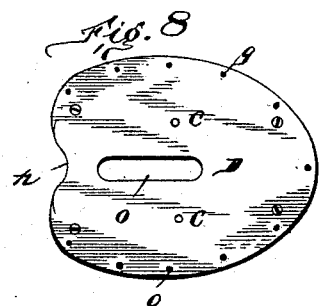
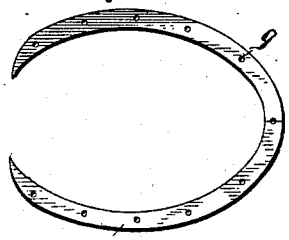
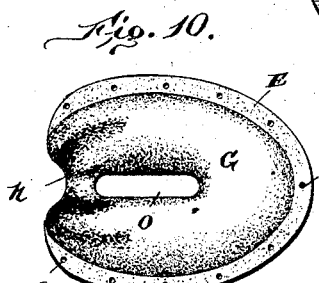
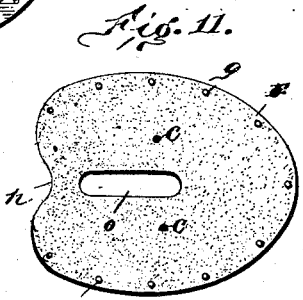
WITNESSES: INVENTOR
F. C. Barry Wm. M. Starr
O. E. Duffy BY
 ATTORNEY.
THE NORRIS PETERS CO., PHOTO-LITHO., WASHINGTON, D. C.

UNITED STATES PATENT OFFICE.

WILLIAM M. STARR, OF WASHINGTON, DISTRICT OF COLUMBIA, ASSIGNOR OF ONE-HALF TO ROLLO W. BROWNE, OF SAME PLACE.

BICYCLE-SADDLE.

SPECIFICATION forming part of Letters Patent No. 656,588, dated August 21, 1900.

Application filed September 29, 1898. Serial No. 692,193. (No model.)

*To all whom it may concern:*

Be it known that I, WILLIAM M. STARR, of Washington, in the District of Columbia, have invented certain new and useful Improvements in Bicycle-Saddles; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to pneumatic bicycle-saddles; and it has for one object simplicity and cheapness in construction, ease and comfort of the rider, and to avoid certain disadvantages heretofore existing in saddles which in many instances have injured the riders of both sexes, such as the generative and reproductive organs.

A further object of the invention is to produce a pneumatic saddle the seat of which will yield to the position of the rider and give him an equal and perfect bearing while seated.

A further object of the invention is to prevent the collapse of a pneumatic or air-inflated saddle should a leak take place, and in other features of the invention, as will be pointed out in the claims.

The invention consists in a concave plate for the seat, an automatic sealing-aperture which will close after the inflating-needle is withdrawn, and inner elastic braces which, should the air escape from the cushion, will prevent the collapse of the seat, and in certain other features, as will be hereinafter more fully shown and described.

In the drawings, Figure 1 is a top plan view of the saddle, part of the covering being broken away to show the elastic braces, made of soft rubber or other suitable compound. Fig. 2 is a vertical longitudinal section of the pneumatic saddle, taken on the line $a\,a$, Fig. 1. Fig. 3 is a vertical cross-section taken on lines $b\,b$, Fig. 1, and $c\,c$, Fig. 2. Fig. 4 is an elevation of a pneumatic air-cushion saddle secured to the base by a flange. Figs. 5 and 6 are vertical and central sections of Fig. 4. Fig. 7 is a top plan view; Fig. 8, an inverted view of the base or saddle plate; Fig. 9, the clamping-plate, which may be in section, if required; Fig. 10, a top plan view of the saddle-cushion with the clamp removed. Fig. 11 is an inverted view of Fig. 10 with the clamping-plate removed, and Fig. 12 shows an edge view of a modified form of the base-plate.

The same letters will indicate like parts throughout the several figures, in which—

A is the top of the saddle, being in an inflated condition, and $a$ a downturned flap or lip upon which to rest the leg.

B represents the elastic braces for preventing collapse of the seat should the air escape from the cushion and which will sustain the weight of the body and prevent it sinking to the base-plate. These elastic braces, when secured and laced and properly covered with leather or rubber, will make an easy, springy, and adjustable seat without the air-cushion.

C is the plastic sealing material, made of soft rubber or other suitable compound, which automatically closes the aperture after the withdrawal of the inflating-needle.

$c$ represents the inflating-apertures in the metal base-plate, and O is the usual opening in the saddle.

$d\,d$ are the saddle supports or springs, secured in the usual way to the saddle-post.

D is the metallic base of the seat, molded in rubber, the rubber covering it inside and out. Thus the parts are more firmly held in position.

Figs. 4, 5, and 6 are modifications of the structure shown by Figs. 1, 2, and 3. In Figs. 4, 5, and 6 the air-cushion G is provided with a flange E. This cushion G forms the seat and lies flat on the base-plate D. The plate D is provided with bolt-holes. Clamp $f$, Fig. 9, is also provided with corresponding bolt-holes, as seen at $g$, so that the bolt-holes in the flange E, plate D, and clamp $f$ register with each other. The object of this arrangement is that when a new cushion-seat is to be substituted for the old the bolts can be unscrewed, the clamp taken off, and the cushion removed from the base. To prevent leakage through the bolt-holes automatic sealing will also be placed over them.

Fig. 12 is another form of the base-plate, and has teats or projections which are tapped out and stud-bolts used, which will do away with nuts.

It will be observed that the base-plate and cushion-seat are cut away, as at h, to prevent touch or friction of the regenerative or productive organs of the human system. My saddle protects the prostate and urethra from undue pressure and also remedies the objectionable driving inward of the coccyx. I avoid these objections also by my construction and retain the body in its natural position while under strain.

The usual bicycle seat posts and bars may be used with my improved seat, which is designed to be interchangeable and made to fit any make of bicycle.

It is obvious that this pneumatic or air-cushion seat need not be confined to bicycles alone, as it may be used for carriages, wagons, chairs, or the like with ease and comfort; nor do I wish to confine myself to the exact form shown and described, as I claim any modifications falling within the scope and spirit of my invention.

What I claim as new, and desire to secure by Letters Patent, is—

1. In a bicycle-saddle, the combination of a pneumatic bicycle-seat, provided with lateral, longitudinal and oblique elastic braces, suitably secured thereto, a sealing material secured to the inner face of the flat wall of the pneumatic seat, bolts for securing the saddle-bearing springs passing through said wall, and arranged to be sealed by said material, substantially as described.

2. The combination in a bicycle-saddle of a pneumatic bicycle-seat, provided with a flange and with lateral, longitudinal and oblique elastic braces, secured at their ends to opposing walls within the air-cushion, of a base provided with suitable clamping-bolt holes, of a clamping-plate provided with projections, which are adapted to receive stud-bolts to secure the air-cushion to the base, of spring-holding bolts, and an automatically-sealing material over said bolts, substantially as described.

3. In a bicycle-saddle, the combination of an air-cushion, a base and a clamping plate, all hollowed out to form a semicircular recess in the front of the saddle, bolts for securing the springs to said plate and means for sealing same, substantially as described.

In testimony that I claim the foregoing as my own I affix my signature in presence of two witnesses.

WILLIAM M. STARR.

Witnesses:
HERBERT C. EMERY,
O. E. DUFFY.